(12) United States Patent
Ward, Jr.

(10) Patent No.: US 10,821,399 B2
(45) Date of Patent: *Nov. 3, 2020

(54) DESICCANT BREATHER

(71) Applicant: John W. Ward, Jr., Lakeland, FL (US)

(72) Inventor: John W. Ward, Jr., Lakeland, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/823,936

(22) Filed: Nov. 28, 2017

(65) Prior Publication Data

US 2018/0304194 A1 Oct. 25, 2018

Related U.S. Application Data

(63) Continuation-in-part of application No. 15/066,902, filed on Mar. 10, 2016, now Pat. No. 9,827,531.

(60) Provisional application No. 62/130,616, filed on Mar. 10, 2015.

(51) Int. Cl.
*B01D 53/26* (2006.01)
*B01D 53/04* (2006.01)

(52) U.S. Cl.
CPC ....... *B01D 53/261* (2013.01); *B01D 53/0415* (2013.01); *B01D 53/0423* (2013.01); *B01D 53/0446* (2013.01); *B01D 2253/106* (2013.01); *B01D 2259/401* (2013.01); *B01D 2259/40084* (2013.01)

(58) Field of Classification Search
CPC ............ B01D 53/0415; B01D 53/0423; B01D 53/0446; B01D 53/261; B01D 2253/106; B01D 2259/40084; B01D 2259/401

USPC .......................................................... 96/147
See application file for complete search history.

(56) References Cited

U.S. PATENT DOCUMENTS

| | | | | |
|---|---|---|---|---|
| 4,548,624 A * | 10/1985 | Waller | ................ | B01D 53/261 252/194 |
| 5,403,387 A * | 4/1995 | Flynn | ................ | B01D 53/0415 96/143 |
| 5,580,451 A * | 12/1996 | Tack | ..................... | B01D 15/00 210/266 |
| 5,779,772 A * | 7/1998 | Unger | .................. | B60T 17/004 96/137 |
| 8,753,436 B1 * | 6/2014 | Curtsinger | ........... | B01D 46/001 55/318 |
| 10,213,725 B2 * | 2/2019 | Gaikwad | ............ | B01D 53/0454 |
| 2006/0065123 A1 * | 3/2006 | Evans | ................ | B01D 53/0415 96/147 |
| 2007/0157658 A1 * | 7/2007 | Kiblawi | ............. | B01D 53/0431 62/474 |
| 2014/0165827 A1 * | 6/2014 | Gaikwad | ........... | B01D 53/0454 95/25 |

* cited by examiner

*Primary Examiner* — Frank M Lawrence, Jr.
(74) *Attorney, Agent, or Firm* — Cygnet IP Law, P.A.; Stephen W. Aycock, II (57) ABSTRACT

Some implementations can include a desiccant breather having an inner pipe having a top portion with a lip extending radially from the inner pipe, the inner pipe having a threaded portion and a top connector. The desiccant breather can also include an outer pipe having a diameter sufficient to accommodate the inner pipe, the outer pipe having a bottom connector and a cap. The desiccant breather can further include a desiccant breather body portion having a cavity configured to hold desiccant material. The lip of the inner pipe can have a diameter equal to or greater than a diameter of the outer pipe.

3 Claims, 13 Drawing Sheets

DESICCANT BREATHER

RELATED APPLICATIONS

This application is a continuation-in-part of U.S. application Ser. No. 15/066,902, entitled "Desiccant Breather", and filed on Mar. 10, 2016, which claims the benefit of U.S. Provisional Application No. 62/130,616, entitled "Desiccant Breather" filed on Mar. 10, 2015, all of which are incorporated herein by reference in their entirety.

TECHNICAL FIELD

Embodiments relate generally to desiccant breathers, and more particularly, to desiccant breathers having replaceable desiccant media.

BACKGROUND

Some conventional desiccant breathers may require an entire breather assembly to be replaced in order to provide new desiccant media. Still other conventional desiccant breathers may have replaceable media, but may expose protected equipment to the environment during replacement of the desiccant media. Further, desiccant breathers that require replacement of an entire assembly may also expose protected equipment to the environment. The exposure of protected equipment to the environment may result in contaminants entering a system which may damage, degrade or quicken the failure of the system.

Some implementations were conceived in light of the above, among other things.

SUMMARY

Some implementations can include a desiccant breather having an inner pipe having a top portion with a lip extending radially from the inner pipe, the inner pipe having a threaded portion and a top connector. The desiccant breather can also include an outer pipe having a diameter sufficient to accommodate the inner pipe, the outer pipe having a bottom connector and a cap. The desiccant breather can further include a desiccant breather body portion having a cavity configured to hold desiccant material. The lip of the inner pipe can have a diameter equal to or greater than a diameter of the outer pipe.

DETAILED DESCRIPTION

Figure 1:
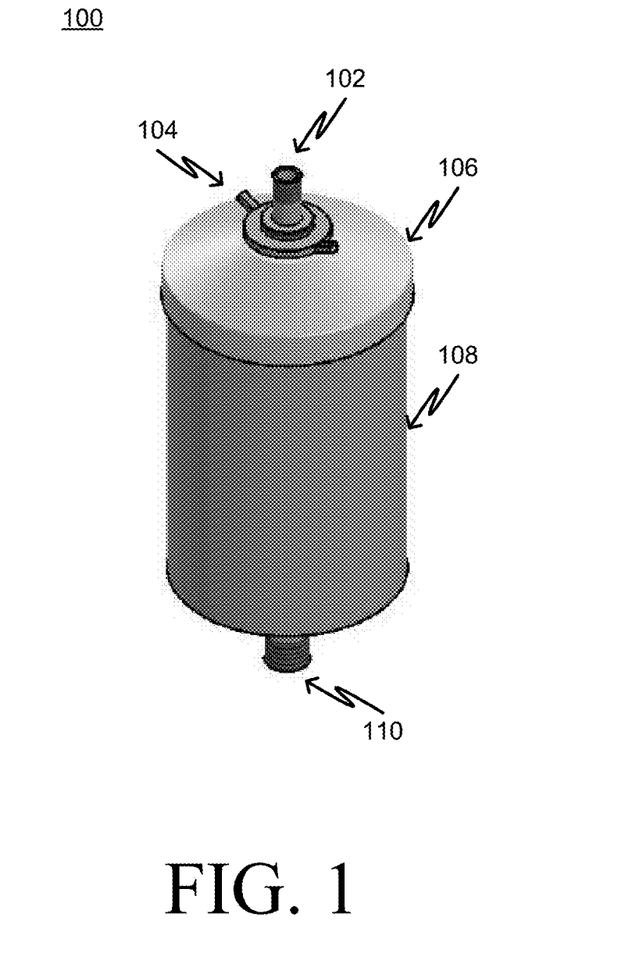
FIG. 1 shows an isometric view of an example desiccant breather in accordance with some implementations.

FIG. 1 shows an isometric view of an example desiccant breather 100 in accordance with at least one embodiment. In particular, the desiccant breather 100 includes a top connector 102, a wing nut 104, a cap 106, a desiccant breather body section 108 and a bottom connector 110. The desiccant breather body section 108 is configured to support a desiccant material holder.

In an example operation, when the desiccant material holder supported by the desiccant breather body section 108 needs to be replaced, the top connector 102 can be disconnected from a line that may be connected to the top connector. The top connector 102 is designed to accept a quick connect fitting that will help prevent air from entering the equipment. The wing nut 104 may be loosened and removed from the top portion of the desiccant breather 100. The inner pipe (shown and described below in connection with FIG. 4) may then slide a distance in a downward direction (e.g., toward bottom connector 110), but be prevented from sliding completely through the desiccant breather 100 as described below in connection with FIG. 4. Once the wing nut 104 is removed, the cap 106 can be removed to expose a cavity within the desiccant breather body section 108 that holds the desiccant material holder (e.g., 1200 shown in FIG. 12), such as a holder containing color changing silica gel desiccant beads. As described below, the inner pipe includes an inner seal (e.g., nitril o-ring 407) that drops below the air slots (shown as 408 in FIG. 4) in the perimeter of outer pipe to effectively seal the outer pipe when the inner pipe slides down while the desiccant material is being changed, thus preventing contaminants from entering any machinery connected to the desiccant breather 100.

Once the desiccant material has been changed (e.g., old desiccant material removed and new desiccant material added), the cap 106 can be replaced on the body section 108 and the wing nut 104 can be refastened to the inner pipe to secure the cap and to also raise the inner pipe and expose the side openings of the outer pipe through which desiccated air can pass.

Figure 2:
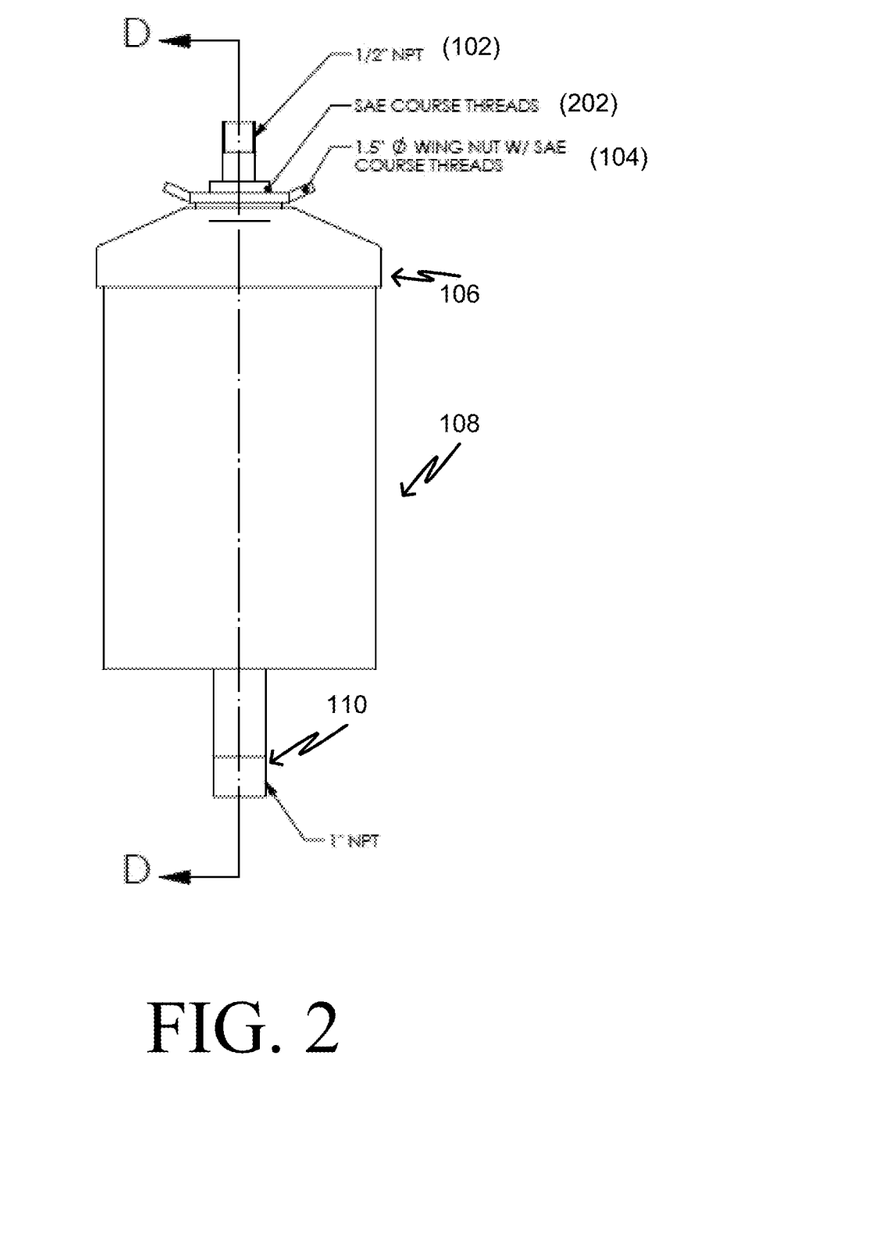
FIG. 2 shows an elevation view of an example desiccant breather in accordance with some implementations.

FIG. 2 shows an elevation view of an example desiccant breather 100 in accordance with at least one embodiment. In addition to the elements described above in connection with FIG. 1, FIG. 2 shows a threaded portion 202 disposed near a top portion of the desiccant breather 100 (e.g., near top connector 102).

Figure 3:
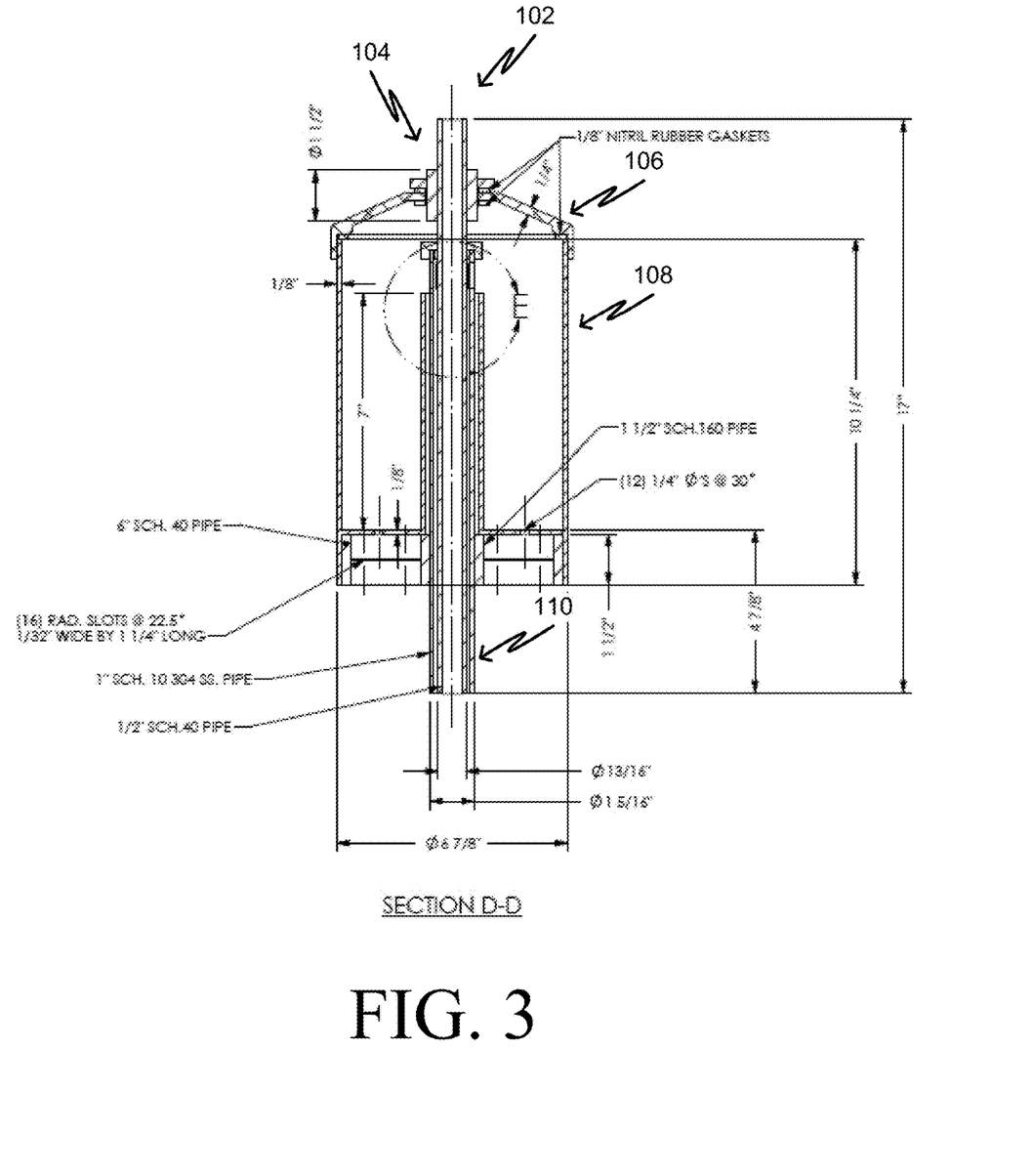
FIG. 3 shows a cross section view of an example desiccant breather in accordance with some implementations.

FIG. 3 shows a cross section view at line D-D of the example desiccant breather 100 shown in FIG. 2. In addition to the elements described above in connection with FIG. 1, FIG. 3 shows some example dimensions and materials of the desiccant breather 100. It will be appreciated that the dimensions and materials shown in FIG. 3 (and elsewhere within the instance application) are for illustration purposes only and are not intended to be limiting.

Figure 4:
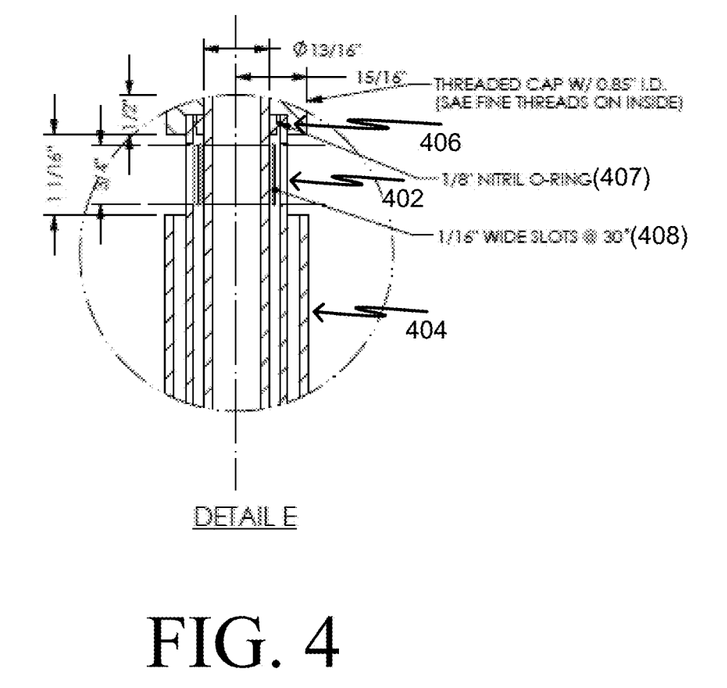
FIG. 4 shows a cross sectional detail view of an example desiccant breather in accordance with some implementations.

FIG. 4 shows a cross sectional detail view of an example desiccant breather 100 in accordance with at least one embodiment. In particular, FIG. 4 shows an inner pipe 402, an outer pipe 404 and an inner pipe top with lip 406. In operation, the inner pipe 402 is slidable within the outer pipe 404 (e.g., the outer pipe has an inner diameter sufficient to permit the inner pipe to be inserted into the outer pipe) and is prevented from sliding downward completely through the outer pipe 404 by the lip of the inner pipe top 406, which extends radially outward from the inner pipe 402 a sufficient distance so as to create a diameter that is equal to or greater than the diameter of the outer pipe 404. The outer pipe 404 also includes air slots 408 for permitting air to enter or exit the equipment, to which it is attached, through the desiccant breather (air slots also shown at 907 in FIG. 9).

Figure 5:
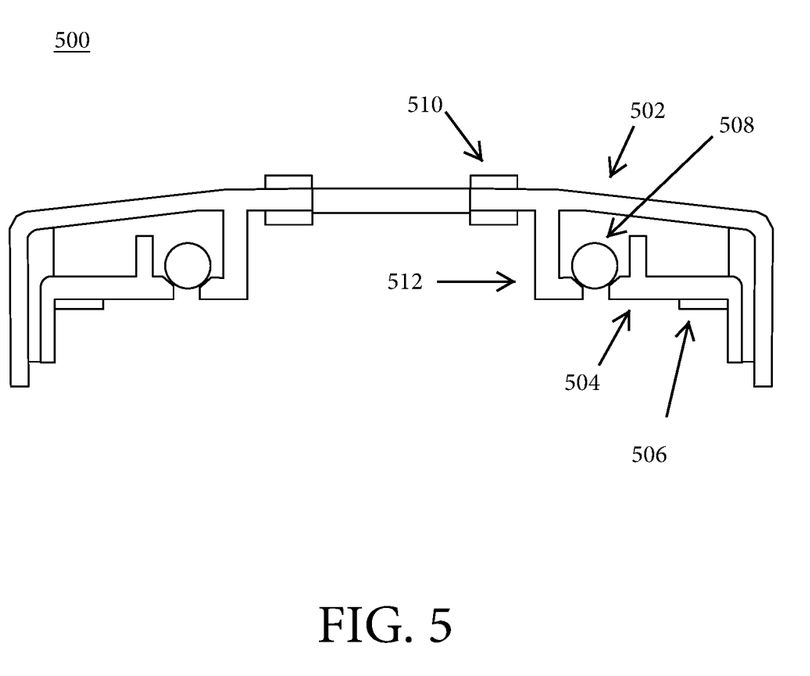
FIG. 5 shows a cross section view of an example desiccant breather cap in accordance with some implementations.
Figure 6:
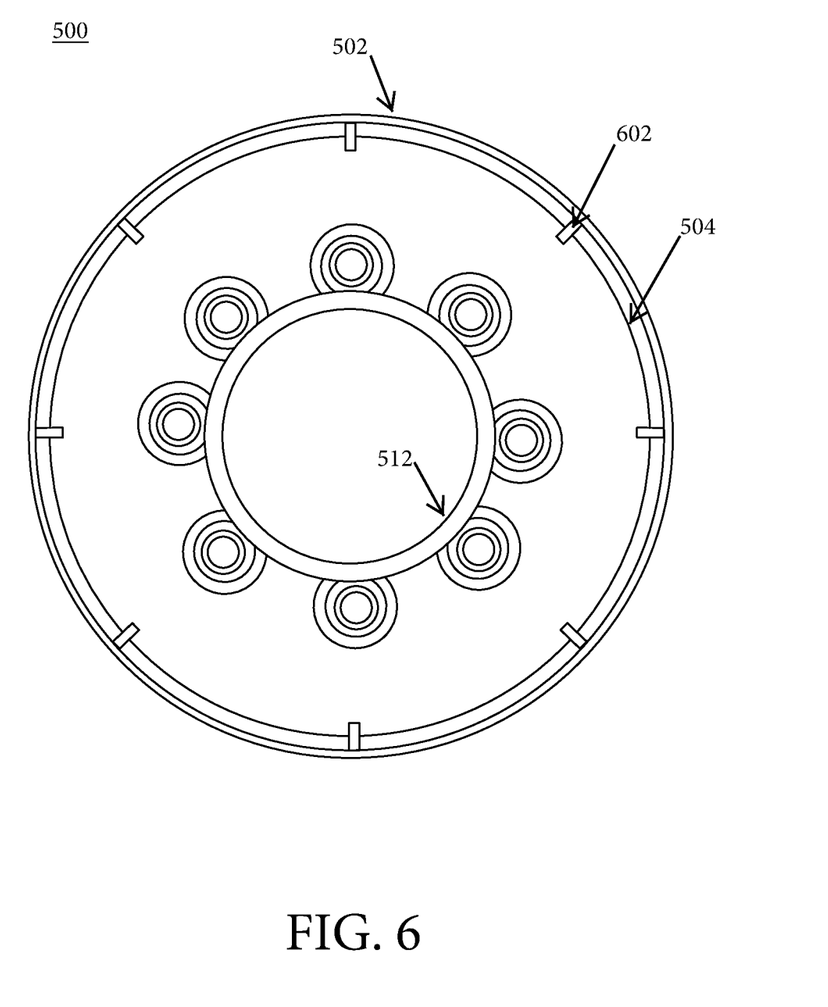
FIG. 6 shows a lateral cross section view of an example desiccant breather cap in accordance with some implementations.

FIG. 5 shows a cross section view of an example desiccant breather cap 500 in accordance with at least one embodiment. In particular, the desiccant breather cap 500 includes an outer cap 502, inner cap 504, first gasket 506, a plurality of rubber balls 508, a plurality of second gaskets 510, and a ball retainer portion 512. FIG. 6 shows a lateral cross section view along line A-A of the example desiccant breather cap 500 shown in FIG. 5 and in which a plurality of spacers 602 are visible.

Figure 7:
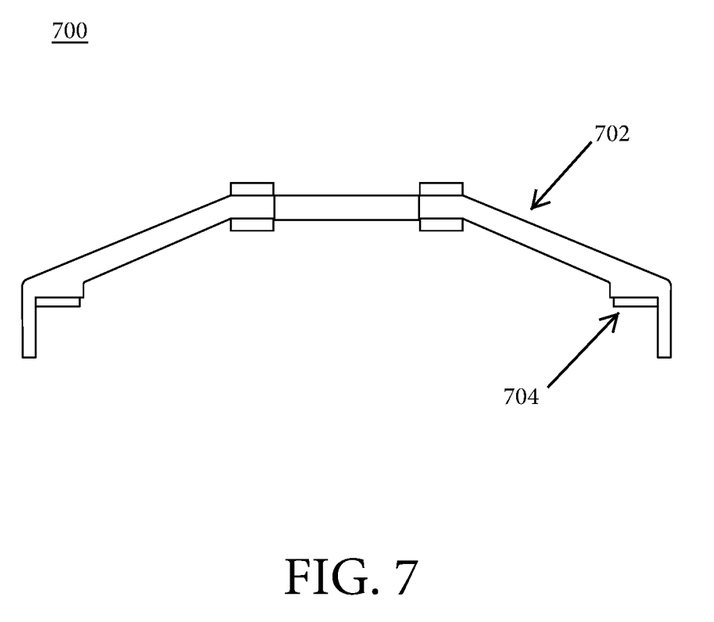
FIG. 7 shows a cross section view of an example desiccant breather cap in accordance with some implementations.
Figure 8:
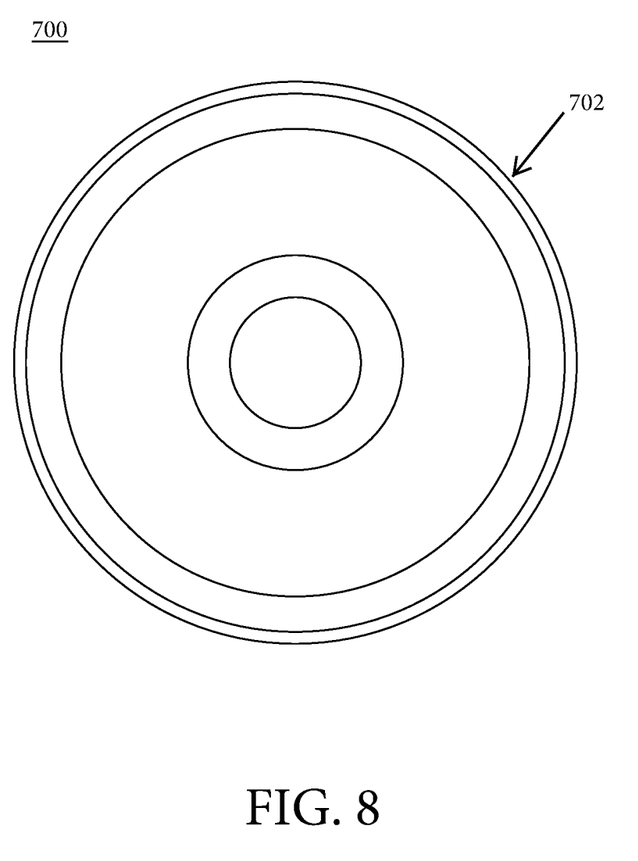
FIG. 8 shows a top plan view of an example desiccant breather cap in accordance with some implementations.

FIG. 7 shows a cross section view of an example desiccant breather cap 700 in accordance with at least one embodiment. In particular, desiccant breather cap 700 includes a cap 702, a first gasket 704 and a plurality of second gaskets 706. FIG. 8 shows a top plan view of the example desiccant breather cap 700 shown in FIG. 7.

Figure 9:
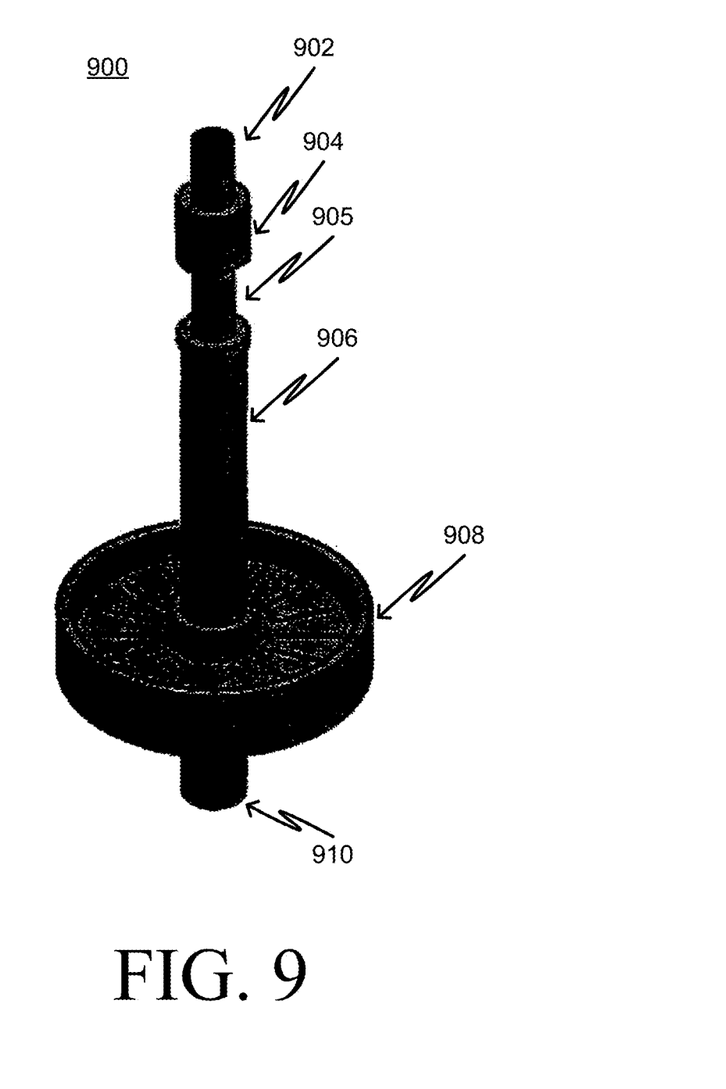
FIG. 9 shows an isometric view of an example inner and outer pipe of a desiccant breather in accordance with some implementations.
Figure 10:
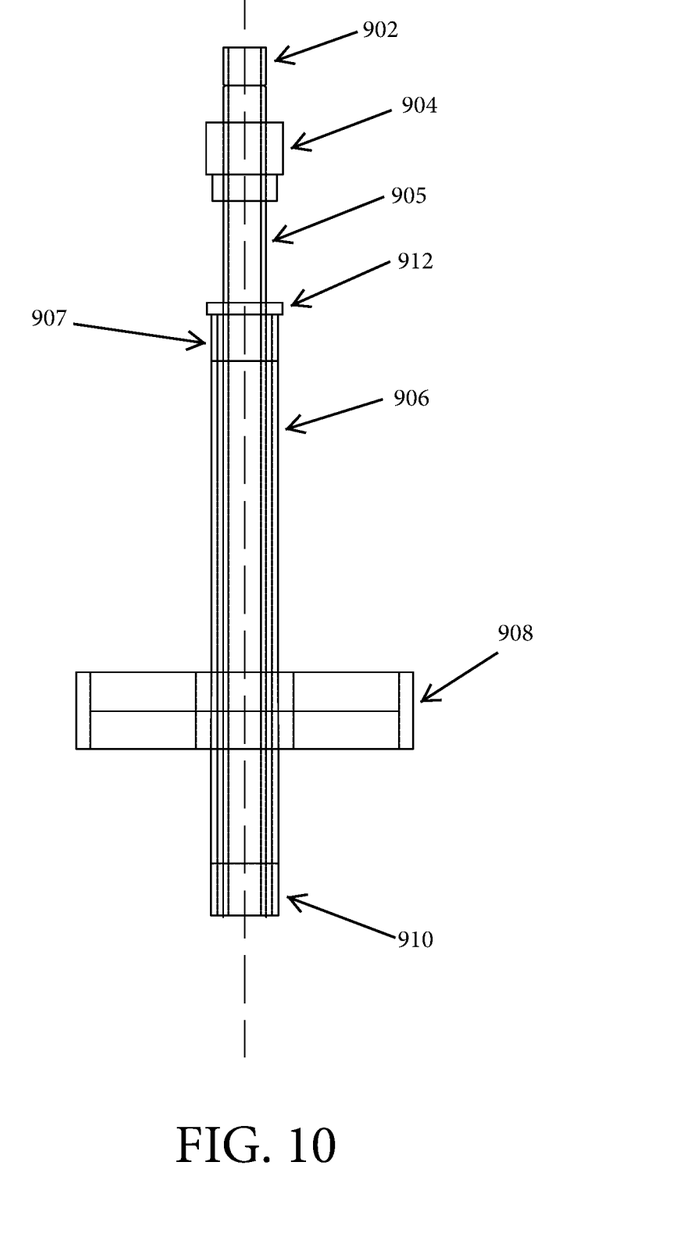
FIG. 10 shows a cross section view of an example inner and outer pipe of a desiccant breather in accordance with some implementations.
Figure 11:
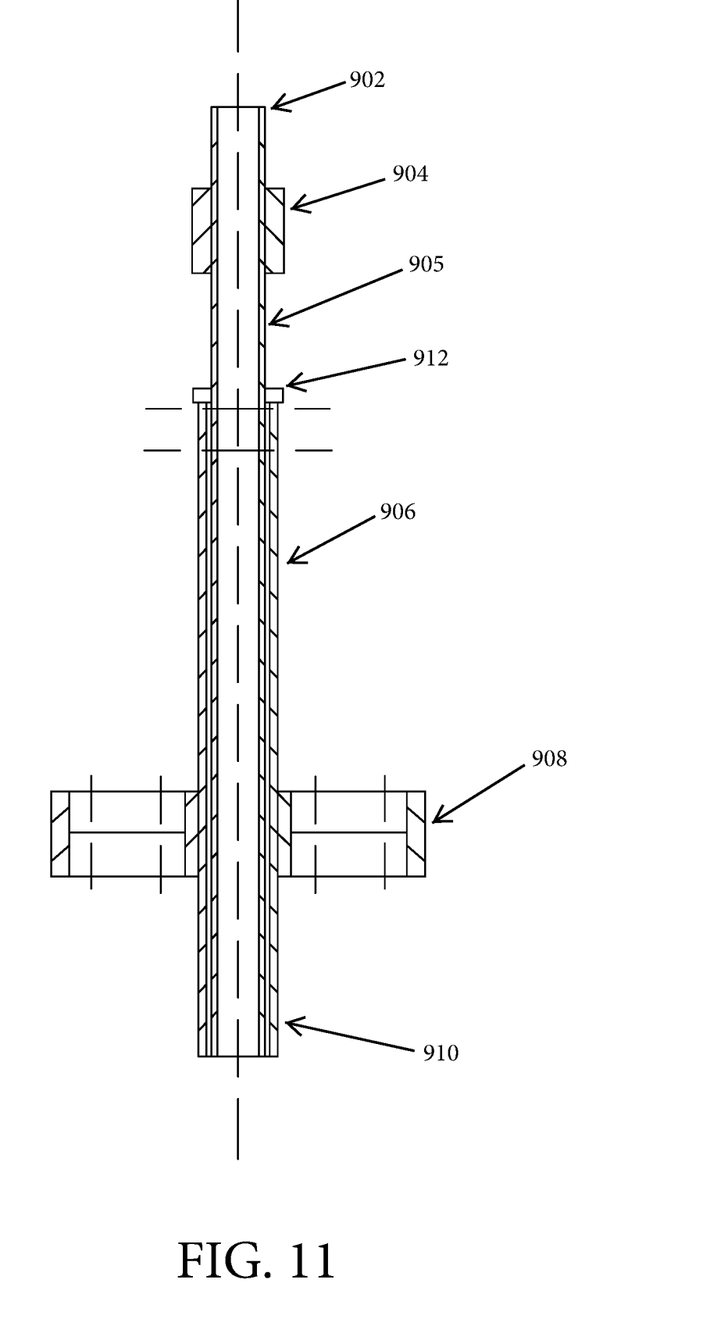
FIG. 11 shows a cross section view of an example inner and outer pipe of a desiccant breather in accordance with some implementations.

FIGS. 9-11 show views of an example inner and outer pipe of a desiccant breather in accordance with at least one embodiment. In particular, an inner/outer pipe assembly 900 includes a top connector 902, a threaded portion 904, an inner pipe top section 905, an outer pipe 906 with air slots 907, a desiccant material retainer section 908 and a bottom connector 910, and an inner pipe top with a lip 912.

Figure 12:
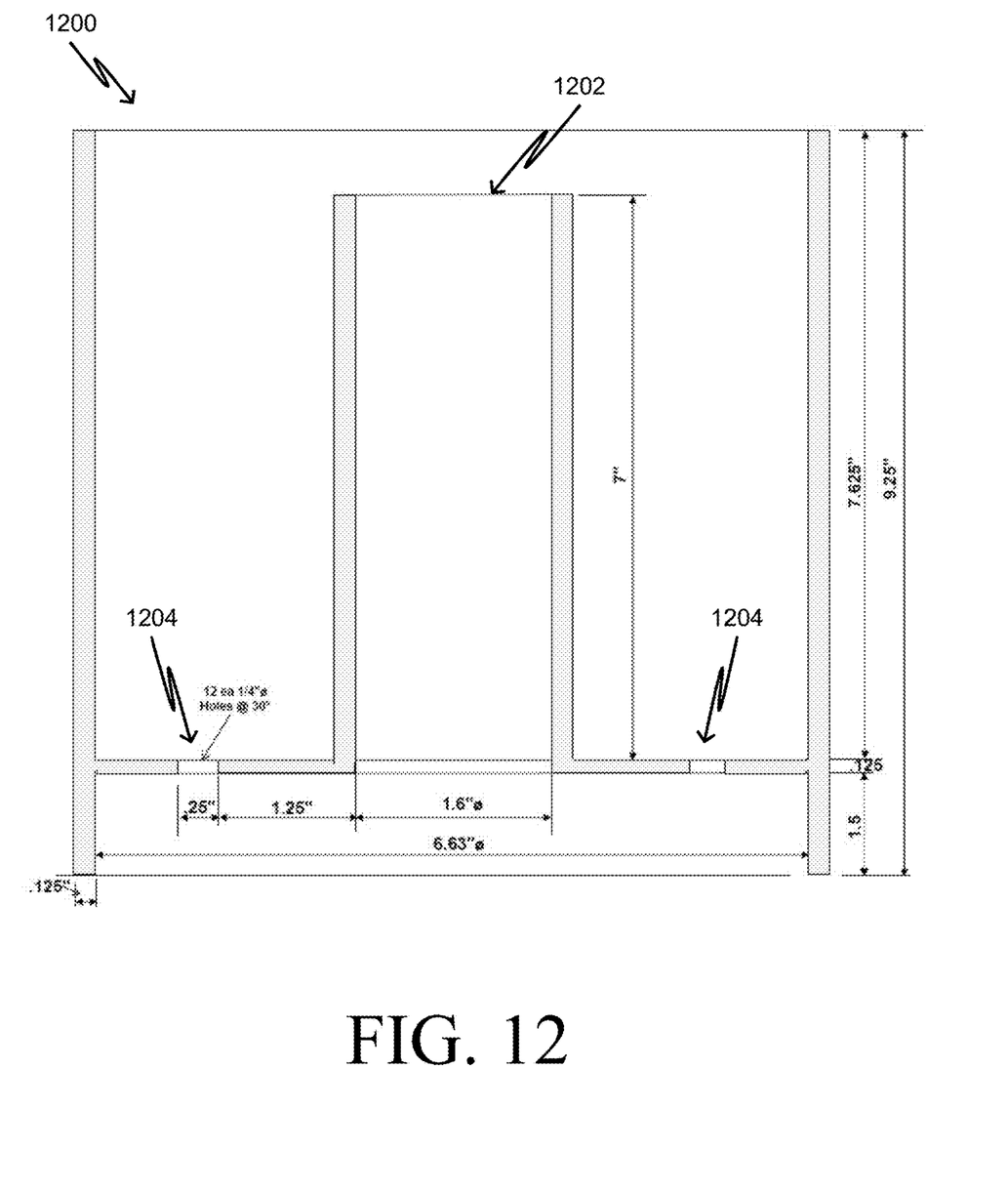
FIG. 12 shows a cross section view of a desiccant breather body section in accordance with some implementations.

An example desiccant breather system can include a removable desiccant holder to facilitate removal of used desiccant and installation of fresh desiccant. During the desiccant replacement process, the desiccant holder may be covered on the top and optionally on the bottom with top and bottom lids. FIG. 12 shows a diagram of a cross-sectional view of an example removable desiccant holder 1200 with a center opening 1202 and air flow openings 1204.

Figure 13:
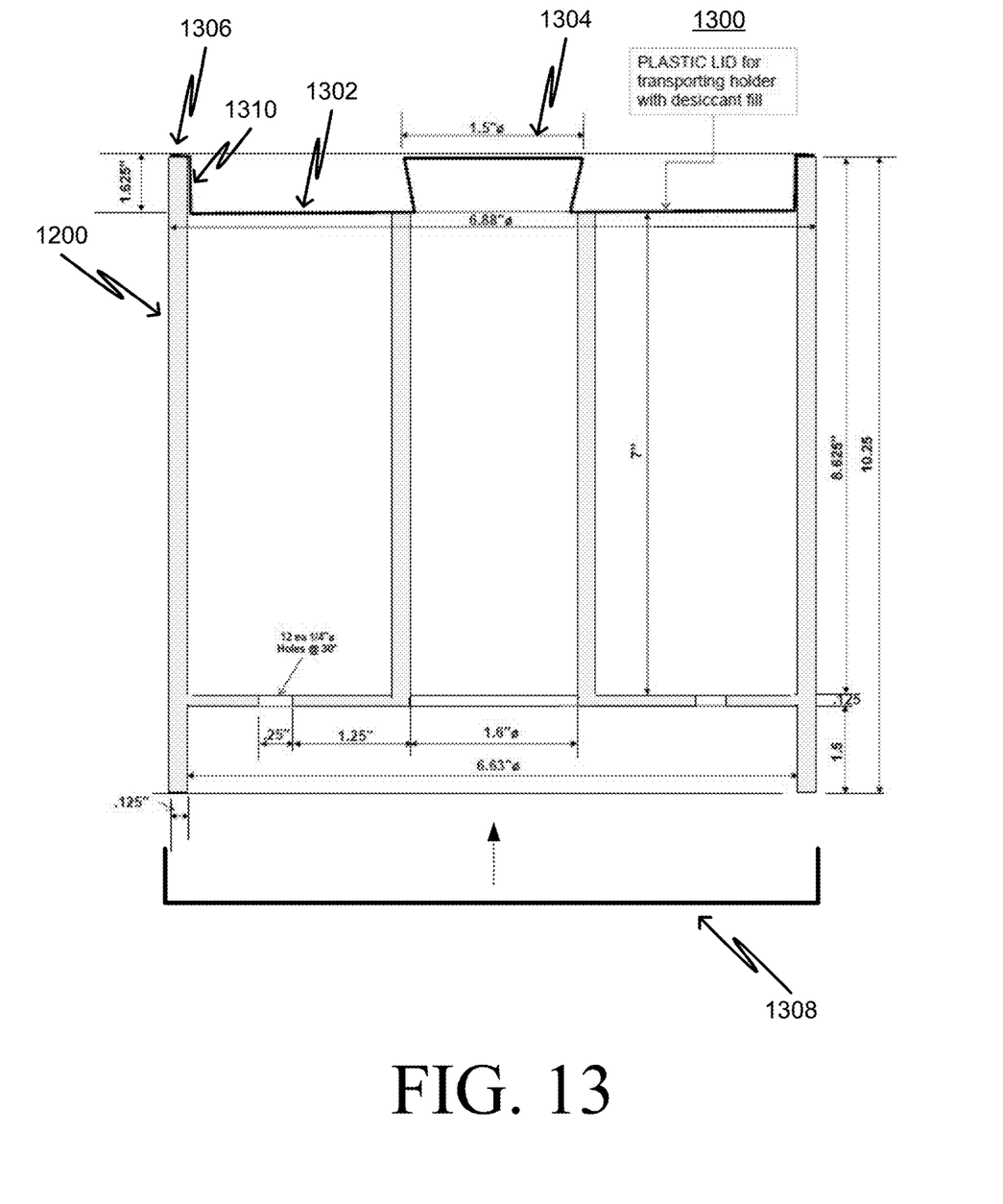
FIG. 13 shows a desiccant holder lid in accordance with some implementations.

FIG. 13 shows a cross-sectional view of an example desiccant holder top lid 1300 in accordance with some implementations. The desiccant holder lid 1300 in top view is round to accommodate a round desiccant holder and includes a desiccant cover portion 1302, a raised handle 1304, and a lip cover portion 1306. The desiccant cover portion 1302 covers the top opening containing the desiccant. The raised handle 1304 can include a semi-trapezoid shape to enable a user to grip and lift the desiccant holder lid 1300 from the desiccant holder 1200. The lip cover portion 1306 is configured to cover the top lip of the desiccant holder 1200. The desiccant holder top lid 1300 can engage the top of the desiccant holder 1200 using an interference fit (or other suitable mechanical engagement arrangement such as threaded, twist locking, etc.). For example, the desiccant holder lid 1300 can engage the sidewalls of the desiccant holder 1200 at the area indicated by 1310.

The system can also include an optional bottom lid 1308 that is configured to fit over the bottom of the desiccant holder 1200 using an interference fit (or other suitable mechanical engagement arrangement such as threaded, twist locking, etc.).

In some implementations, the base unit can be made of steel (e.g., stainless to minimize potential rusting) or a plastic of suitable strength to hold up to stresses that can be imposed if a filter hose is connected. The desiccant holder can be a UV resistant clear plastic to permit viewing of the desiccant beads. The covers can be metal or plastic (e.g., a distinguishing colored plastic).

Some implementations can include a mesh attached to the inner pipe near its base to help prevent oil mist from traveling back up through the annulus between the inner and outer pipes.

It is, therefore, apparent that there is provided, in accordance with the various embodiments disclosed herein, a desiccant breather.

While the disclosed subject matter has been described in conjunction with a number of embodiments, it is evident that many alternatives, modifications and variations would be, or are, apparent to those of ordinary skill in the applicable arts. Accordingly, Applicant intends to embrace all such alternatives, modifications, equivalents and variations that are within the spirit and scope of the disclosed subject matter.

What is claimed is:

1. A desiccant breather system comprising:
   an inner pipe having a top portion with a lip extending radially from the inner pipe, the inner pipe having a threaded portion, a seal and a top connector;
   an outer pipe having a diameter sufficient to accommodate the inner pipe, the outer pipe having a bottom connector;
   a cap;
   a removable desiccant material holder;
   a desiccant breather body portion having a cavity configured to support the desiccant material holder; and
   a desiccant holder top lid,
   wherein the lip of the inner pipe has a diameter equal to or greater than a diameter of the outer pipe, and
   wherein the outer pipe also includes one or more slots arranged to permit air to enter and exit equipment connected to the desiccant breather when the inner pipe is in a first position in which the seal of the inner pipe is raised above the slots of the outer pipe and, when the inner pipe is in a second position, airflow through the one or more slots is prevented by the seal of the inner pipe contacting the outer pipe at a position below a bottom of the slots in the outer pipe.

2. The system of claim 1, wherein the top lid includes a desiccant cover portion, a raised handle, and a lip cover portion.

3. The system of claim 1, further comprising a bottom lid.

* * * * *